Feb. 27, 1951     M. V. SPASH     2,543,423
PINKING SHEARS
Filed May 29, 1946
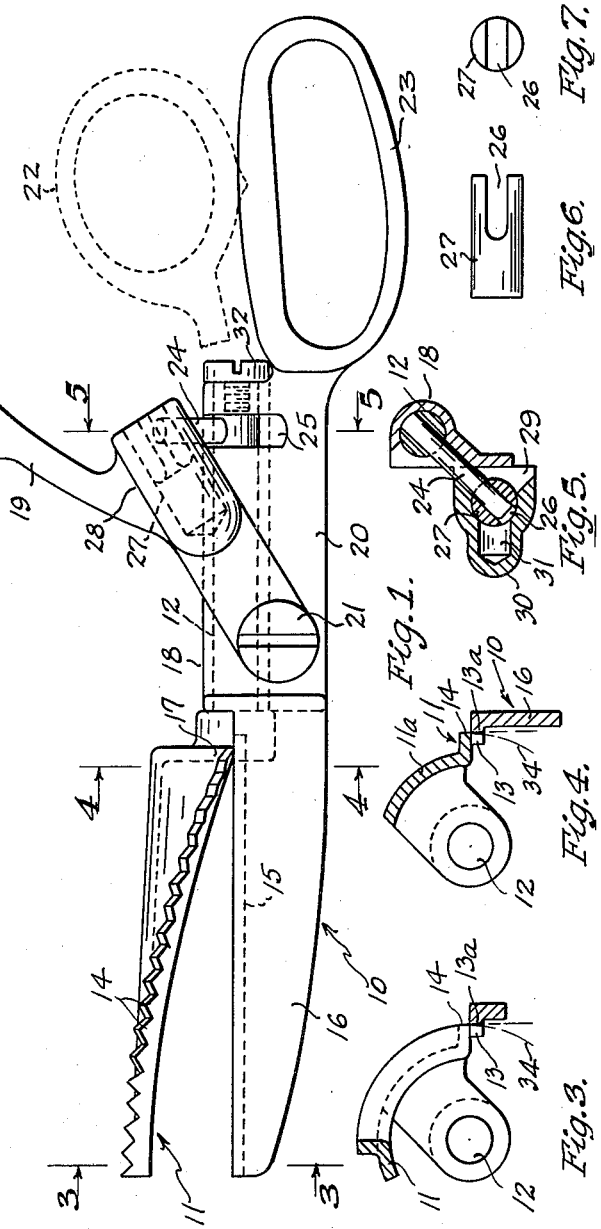
INVENTOR
Margaret V. Spash
BY
Wooster & Davis
ATTORNEYS Patented Feb. 27, 1951

2,543,423

UNITED STATES PATENT OFFICE 2,543,423

PINKING SHEARS

Margaret V. Spash, East Norwalk, Conn.

Application May 29, 1946, Serial No. 673,184

2 Claims. (Cl. 30—230)

This invention relates to pinking shears, and has for an object to provide a new construction and arrangement for this type of shear, which is a material improvement over the old type of pinking shear where the blades cross and are pivoted together intermediate their lengths or between the blades proper and the operating handles.

It is an object to provide a construction of pinking shear in which the cutting teeth are so arranged that they all cut at the same angle and therefore the teeth can be more accurately and more easily ground, as all the teeth on a blade can be ground alike.

Another object is to provide a construction in which there is no change in the cutting angle between the blades as the cutting point moves from the heels toward the points of the blades, as in ordinary pivoted shears.

Another object is to provide a construction and arrangement of this type of shear in which there is no material variation in the leverage in cutting at the points of the blades required over that in cutting at the heel, but that the leverage and therefore the force required in cutting is practically uniform and the same throughout the entire length of the blades.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side elevation of my improved shear showing the blades in the open position;

Fig. 2 is a top plan view thereof;

Fig. 3 is a section substantially on line 3—3 of Fig. 1;

Fig. 4 is a section substantially on lines 4—4 of Fig. 1;

Fig. 5 is a section through the driving mechanism of the movable blade substantially on the plane of line 5—5 of Fig. 1, but showing its position with the blade in the closed position, and Figs. 6 and 7 are side and end views respectively of one of the elements of the driving means.

These shears, instead of having the blades crossed and pivoted at the shanks, as in the ordinary shears, comprise a stationary blade 10 and a movable blade 11, which may be partly cylindrical or any shape to provide a curved or helical blade, and is mounted on a shaft 12 located at one side of and extending longitudinally of the first or stationary blade. The stationary blade is provided with the zigzag teeth 13, while the curved or movable blade 11 is provided with co-acting zigzag teeth 14 to give the usual zigzag cut secured with pinking shears. The teeth 13 on stationary blade 10 are at the top of the inner edge portion 15 extending at right angles to the upright or body portion 16. The edge of the movable blade 11 is curved as shown, the toothed edge being in a sort of helical spiral, so that as it is turned to swing the toothed edge downwardly from the positions of Figs. 1 and 2, past the lower or stationary blade, the cutting will begin near the heel end 17 and progress outwardly toward the free end.

As indicated, this blade is mounted on a horizontal shaft 12 located in a bearing 18 located to one side of the shank of the first blade, and is operated by a movable handle 19 pivoted to the shank 20 of the first blade by any suitable means, such as the pivot screw 21. At the free end of the handle is the usual loop 22 for the thumb of the user and at the opposite end of the shank 20 from the blade 10 is the usual larger loop 23 for the fingers.

A suitable driving connection is provided between the movable handle 19 and the shaft 12. This may be of different types, such, for example, as meshing beveled gears or similar driving means, but that shown is preferred, comprising a laterally extending pin 24 mounted in the shaft 12 and extending through a slot 25 in the shank and the bearing. At its outer end this pin slides in a transverse slot 26 in a drive rod 27 mounted in a bearing 28 in the shank of the movable handle 19, the side of this bearing being notched or slotted, as indicated at 29, to permit swinging movement of the drive pin. There may be an extension 30 on one side of the shank provided with a recess 31 to provide clearance for the free end of the pin 24 as it passes through the center of its swinging movement. The shaft 12 may be held in the bearing by any suitable means, such as a screw 32 threaded in the end of the shaft. It may be found desirable or necessary to use thin washers 33 at the opposite ends of the shaft to position the movable blade accurately to the stationary blade, so the teeth of the two blades will match up accurately and properly.

There are several advantages in this construction and arrangement of the blades over the ordinary pinking shears, where the blades cross and are pivoted at the shanks, the same as ordinary shears, so that the blades swing in the same plane. In this latter type of shear, because the angle between the blades varies from the heel toward the free ends or tips of the blades as the blades are brought to the end of the cutting operation, the angle of the cutting edges of the individual teeth varies, so that in order for the shears to work properly, each tooth along the blade has to be individually and differently ground, making them expensive to manufacture and sharpen, and unless they are accurately and properly ground they will not operate properly. Also, with that type of shear, the leverage of the blades on the handles varies and increases from the beginning of the cut at the heel toward the free ends, so that it is difficult to cut at the free ends of the blades.

With the improved shears of this application, there is no material variation in the leverage from the handles, because the cutting teeth all along the blade are the same distance from the axis of rotation. There is a slight variation, due to the variation in the angles of the drive pin during operation of the blade, but this is not enough to be material. With this new construction it is easier to cut and grind the teeth accurately because they are all at the same angle and there is no change in the cutting angle between the blades as there is in the ordinary pivoted blades. Although the teeth 14 on the curved edge of the movable blade are somewhat different from the teeth 13 on the edge of the stationary blade, still all the teeth 13 are alike and may be ground alike, and all the teeth 14 are alike and may be ground alike. They are, therefore, easier to manufacture and get right, and it is easier to get them to properly coact in the cutting operation. As indicated, other means of driving the movable blade may be used, but that shown is found to be very satisfactory.

It is not necessary to have the body portion 11a of the movable blade cylindrical so long as the cutting edge provided with the teeth is curved and of a generally spiral shape. That is, the body could be a strip of flat stock twisted to give a spiral edge. It is also not necessary that the teeth be cut in an integral part of the blades, as the teeth could be cut on separate pieces attached to the body of the blades. It is also not necessary to undercut the teeth on the stationary or lower blade, as it will be seen from Figs. 3 and 4 the cutting edges of the teeth 14, as they move downwardly past the teeth 13 of the lower blade, will move away from the teeth 13 as they move in the arc of a circle about the axis of the shaft. This is indicated in Figs. 3 and 4, which show their free ends will move on the arc 34, which will carry them away from the back 13a of the teeth of the stationary blade, and therefore these backs may be straight, which makes them easier to manufacture and grind accurately.

Having thus set forth the nature of my invention, I claim:

1. Shears of the character described comprising an elongated stationary blade and a movable blade, said blades being provided with cutting edges comprising a series of teeth cooperating to form a zigzag cut, said edges being relatively inclined in a direction longitudinally of said edges so as to cut progressively along the blades, a shaft extending longitudinally of the stationary blade on which the movable blade is mounted, a handle connected to the stationary blade, a second handle pivoted to the latter blade, a pin mounted in the shaft and extending laterally therefrom, and means forming a slidable connection between said pin and the movable handle for operating the shaft.

2. Shears of the character described comprising an elongated stationary blade and a movable blade, said blades being provided with cutting edges comprising a series of teeth cooperating to form a zigzag cut, said edges being relatively inclined in a direction longitudinally of said edges so as to cut progressively along the blades, a bearing in the shank of the stationary blade, a shaft in said bearing extending longitudinally of said blade and mounting the movable blade, a handle on said shank, a movable handle pivoted to the shank, a drive rod mounted in said handle, a pin mounted in the shaft and projecting laterally therefrom, and a sliding driving connection between said rod and the pin for turning the shaft and movable blade.

MARGARET V. SPASH.

REFERENCES CITED

The following references are of record in the file of this patent:

UNITED STATES PATENTS

| Number | Name | Date |
| --- | --- | --- |
| 2,290,203 | Nikonow | July 21, 1942 |

FOREIGN PATENTS

| Number | Country | Date |
| --- | --- | --- |
| 11,960 | Great Britain | of June 2, 1890 |
| 111,816 | Austria | Dec. 27, 1928 |